April 16, 1929.                 G. C. MARTIN                1,709,359
                                SHOCK ABSORBER
                             Filed April 13, 1926
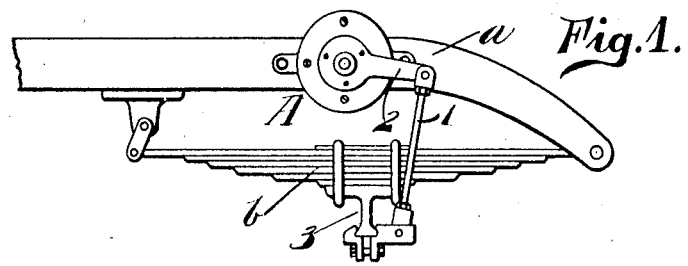
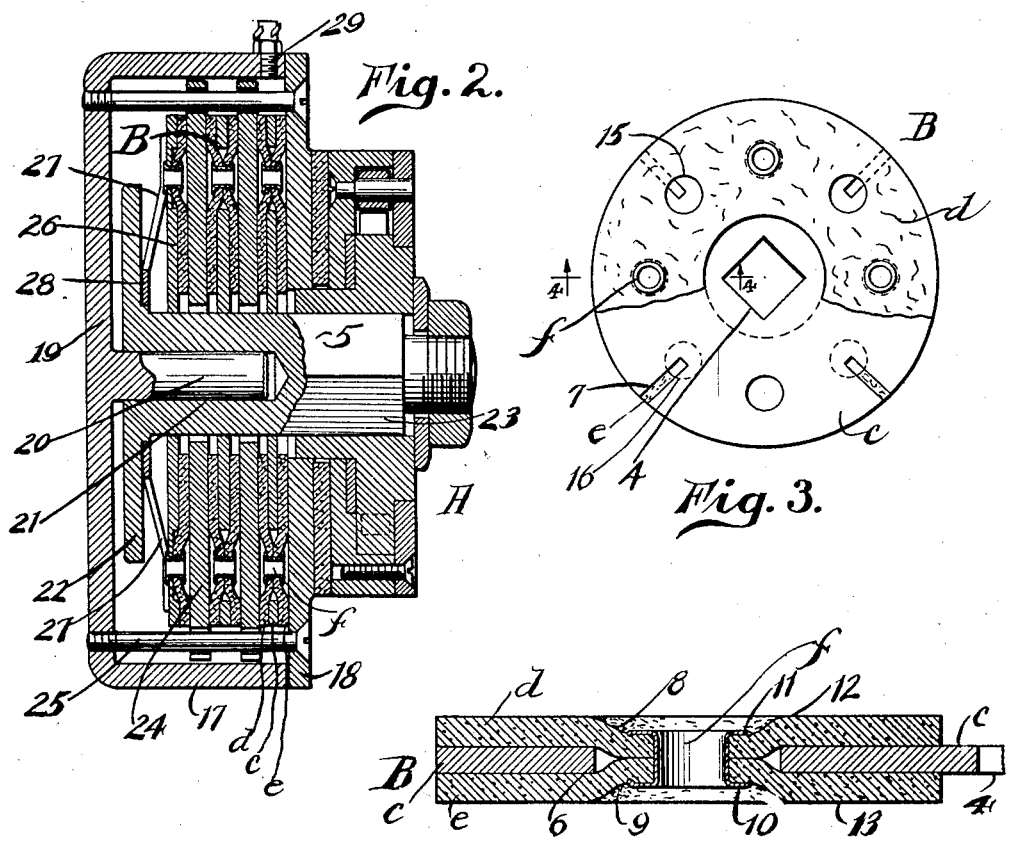
INVENTOR,
George C. Martin;
BY
Blakeslee & Brown,
ATTORNEYS.

Patented Apr. 16, 1929.

1,709,359

UNITED STATES PATENT OFFICE.

GEORGE C. MARTIN, OF LOS ANGELES, CALIFORNIA.

SHOCK ABSORBER.

Application filed April 13, 1926. Serial No. 101,613.

This invention relates to shock absorbers, and has particular relation to improvements in disc shock absorbers. This invention is not directed specifically to the disc or clutch type of absorber, but rather to improvements in certain elements entering into the make-up of such a form of shock absorber such as I have shown and disclosed in my pending applications for shock absorbers, Serial No. 17,929 filed March 24, 1925, and Serial No. 32,928, filed May 26, 1925.

In the different forms of shock absorber of the disc clutch type it becomes important to properly associate the friction surfaces together and so that they will at all times operate with the greatest efficiency. I have found it expedient to provide fixed discs of metal with movable discs therebetween and each movable disc comprises three elements, namely, a metal disc with some friction material on opposite surfaces of such metal disc. I use leather as such friction material in certain embodiments of my various inventions. The problem is to properly unite the leather to the central metal disc so that movement of the metal disc will also move the friction discs and likewise so that proper lubrication will be maintained between the friction discs and the fixed metal discs.

A specific object of my invention is to provide friction discs which may be united in such a manner as to provide no projections that would interfere with the proper action of such discs or that would in any manner contact with any disc with which such friction discs were in contact.

Another specific object resides in the provision of novel means whereby the surfaces of the friction discs may be lubricated.

The invention has for further objects the provision of an improved shock absorber which will be superior in point of relative simplicity and inexpensiveness, taken in conjunction with utility, durability and general efficiency and serviceability.

With the above mentioned and other objects in view, the invention consists in the novel and useful provision, formation, construction, association and relative arrangement of parts, members and features, all as shown in the drawing, described generally, and finally pointed out in the claims.

In the drawing:

Figure 1 is a side elevation of a vehicle frame with its spring and the improved shock absorber mounted in connection with a frame and spring for controlling movement of such spring;

Figure 2 is a vertical sectional view of the shock absorber on an enlarged scale from the showing of Figure 1;

Figure 3 is a fragmentary plan view of one of the movable discs of the shock absorber; and, Figure 4 is a cross sectional view on the line 4—4 of Figure 3, and on an enlarged scale from the showing of Figure 3.

Corresponding parts in all the figures are designated by the same reference characters.

Referring with particularity to the drawing, I designate the improved shock absorber as a whole by A and one of the movable disc members by B. The shock absorber as a whole is shown in Fig. 1 bolted to a vehicle frame $a$ with a link 1 connecting an arm 2 of such shock absorber with a member 3 associated with the vehicle spring $b$.

The present invention resides more particularly in the member B and such member will be described first, after which its relation to other elements of the shock absorber will be detailed. The member B includes a metal disc $c$ adapted to be interposed between two friction discs $d$ and $e$. The metal disc $c$ acts as a backing or stiffener for the discs $d$ and $e$. The discs $d$ and $e$ may be formed of any friction material such as leather or the like, and as the member B considered as an entirety, in the present instance, is adapted to be the member that is movable relative to some other disc member which is fixed, it becomes essential that the discs $d$ and $e$ be so united to the disc $c$ that no external protruding members should extend outwardly from the working surface of said discs. If protruding members do so extend, the fixed disc if it be of metal, will be scored, or at best, the action desired between fixed and movable discs will be altered. Furthermore, the friction discs $d$ and $e$ would not in and of themselves be stiff enough or strong enough to permit their rotation by some means passed therethrough as soon as they were provided with a stiffening means such as a disc $c$, and it therefore becomes essential in the present invention to so unite the friction discs to the discs $c$ that the discs $d$ and $e$ be rotated as the disc $c$ is rotated.

In other words, there must be no creep of the friction disc or discs relative to the disc c. Accordingly I have deemed it expedient in practicing the present invention to provide a disc as c which may be formed of metal and which disc may or may not have a squared central opening 4 whereby the same may be mounted upon a square shaft 5. Adapted to be secured on opposite faces of such disc are the friction discs d and e which are substantially annular in form. The metal disc c is formed with one or more bores 6 which are preferably equi-distantly spaced apart, the drawing showing four of such bores 6 ninety degrees apart. Likewise the said disc c is formed with slots 7 which extend from the periphery of such disc and radially inwardly. The number of such slots will depend upon use and circumstances, but in the present instance four are provided which are equi-distantly spaced between the bores 6. The discs d and e are placed on opposite sides of the disc c and so that the peripheries of such discs are in alignment, as shown in Figure 4, whereupon the discs are secured together so that portions of their inner faces are in contact. This is accomplished by forcing such discs d and e through the bores 6 and then securing such discs when so positioned by any suitable means such as metal eyelets f. Preferably the diameter of each bore 6 is large relative to the diameter of the securing means f. Thus the portion of the discs d and e adjacent the bores 6 will be depressed downwardly and inwardly of the bore or bores 6, as illustrated at 8 and 9. If metal eyelets are used as the securing means f they are preferably of thin construction and likewise of a soft metal and so stamped that the flanged surfaces thereof 10 and 11 are spaced below the outer surfaces 12 and 13 of the discs d and e. In addition, the discs d and e are each provided with transverse openings 15 and 16 which communicate with the slots 7 when the discs are positioned relative to the disc c. Thus, lubricating fluid may be injected into the said slots 7 and such fluid will spread outwardly onto the working faces of the discs d and e by passing through the openings 15 and 16 of said discs. In utilizing a friction member such as B as a shock absorber unit, I have shown in Figure 2 a shock absorber which includes a casing 17 having an annular cover plate member 18, and which casing has its back wall 19 provided with a stud 20 which is concentric within said casing. This stud acts as a support upon which is the shaft 5. This shaft is formed with a central bore 21 to receive said stud 20 and the shaft is formed with a flanged base 22 with the periphery of such shaft formed with flat faces 23. In the present instance the shaft is substantially square in cross section. Within the casing 17 and adapted to be mounted on the said shaft are the elements B, and interposed between such elements B are fixed discs 24, which fixed discs are of greater diameter than the diameter of the elements B, with the said fixed discs maintained in a certain position and against rotation by bolts 25 passed through openings in the said discs and secured to the cover and base of the casing. It is to be noted that one of the elements B has not double faces, that is to say, does not have friction material on both sides of a metal backing, this being shown at 26. This particular member at 26 is adapted to have leaf spring arms 27 of a spring member 28 in contact with the disc c of such member 26 and such member 28 is in engagement with the flange 22 of the shaft. The inner surface of the cover 18 acts as one fixed disc against which a friction surface is adapted to contact. Other portions of the device shown in Figure 2 will not be described except to say that the casing 17 is provided with a fitting 29 whereby the interior of said casing may be filled with oil or other lubricating fluid. When the shaft 5 is moved the members B will be turned and have their friction surfaces in engagement with the fixed discs 24. An inspection of Figure 2 will show that only the friction surfaces of the friction discs will contact with the surfaces of the fixed discs and that the eyelets or other fastening means will not contact with such surfaces to in any way injure the same. Oil within the casing may, in addition to passing through the oil openings 7, likewise pass through the annular opening of the eyelets so that oil will contact with the surface of the fixed discs.

The invention while simple in nature is extremely important for the purpose intended, and it has been found that after a few hours use the friction discs d and e become so embedded within the bore or bores 6 that they would retain their position and not slip relative to the disc c regardless of whether or not any fastening means f were provided.

It is obvious that various minor changes and modifications may be made in practicing the invention, in departure from the particular showing of the drawing, without departing from the true spirit of the invention.

Having thus disclosed my invention, I claim and desire to secure by Letters Patent:

1. In shock absorber construction, a metal disc formed with a bore, two friction discs on opposite sides of said metal discs, said friction discs adjacent said bore in the metal disc being forced into contact within said bore, and means for maintaining said friction discs in contact within said bore; said means comprising a metal eyelet passed through said friction discs and having end flanges for gripping such friction discs, said end flanges being spaced from that surface of the friction discs surrounding said bore in the metal disc.

2. In a shock absorber, a metal disc formed with a bore, a friction disc formed with a bore of lesser diameter than the bore of the metal disc, and means for maintaining the portion of the friction disc surrounding the bore thereof within the bore of the metal disc and in such a manner that passage is effected through the bore of the friction disc.

In testimony whereof, I have signed my name to this specification.

GEORGE C. MARTIN.